2 Sheets
Sheet 1

B. T. Roney.
Mower.

Nº 14409      Patented Mar. 11, 1856.

Witnesses
Henry Nowson
William E. Walton

Inventor
B. T. Roney

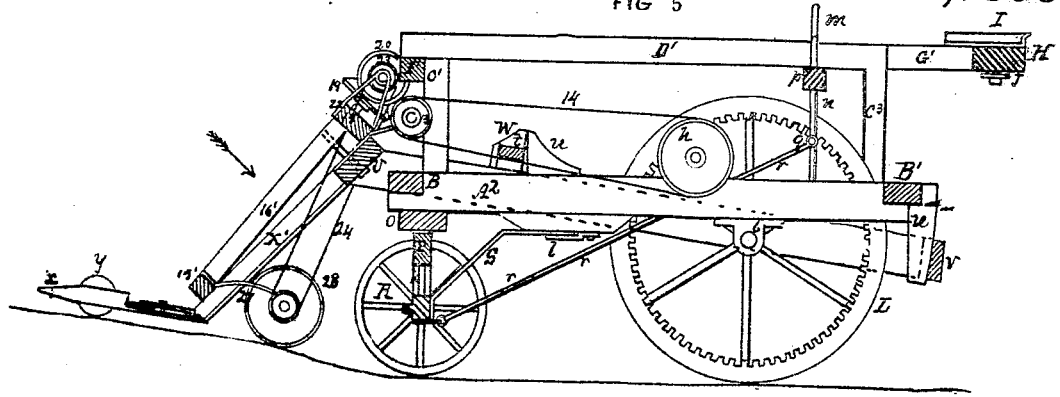
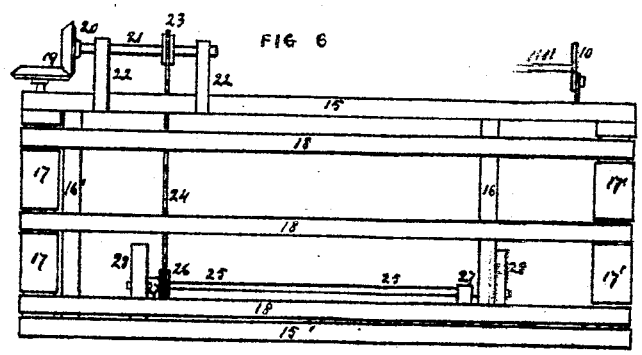
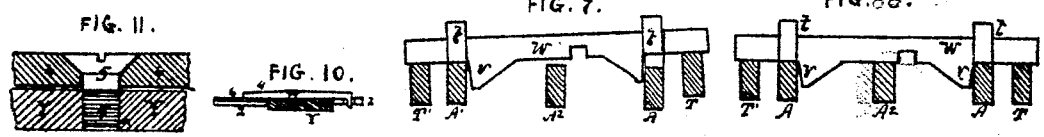
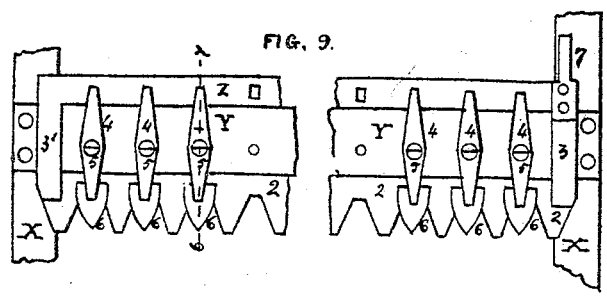

UNITED STATES PATENT OFFICE.

B. T. RONEY, OF PHILADELPHIA, PENNSYLVANIA.

IMPROVEMENT IN GRAIN AND GRASS HARVESTERS.

Specification forming part of Letters Patent No. 14,409, dated March 11, 1856.

*To all whom it may concern:*

Be it known that I, BENJAMIN T. RONEY, of the city of Philadelphia, and State of Pennsylvania, have invented certain new and useful Improvements in Mowing and Reaping Machines; and I do hereby declare that the following is a full, clear, and exact description of the same, reference being had to the accompanying drawings, and to the figures and letters of reference marked thereon.

My invention relates to that class of mowing and reaping machines in which the cutters are situated in advance of the horses; and it consists in constructing a machine with two distinct frames separate from but dependent upon each other. One frame is the permanent or gear frame, to which are attached the supporting-wheels, the driving-wheel, and the gearing for producing the motion to be transferred to the second part of my machine, which I call the "movable" or "cutter" frame. The motion for operating the cutters, produced by the driving-wheel and gearing on the gear-frame, is communicated by a band or chain from a pulley on the said gear-frame to a pulley on the cutter-frame. These two frames are so adapted to each other, by means hereinafter fully explained, that the cutter-frame may be elevated or lowered and oscillate longitudinally and laterally on the gear-frame, allowing the cutters to operate on level or uneven ground without disturbing the tightness and efficacy of the above-mentioned driving band or chain.

In order to enable others skilled in the art to make and use my invention, I will now proceed to describe its construction and operation.

Figure 1:
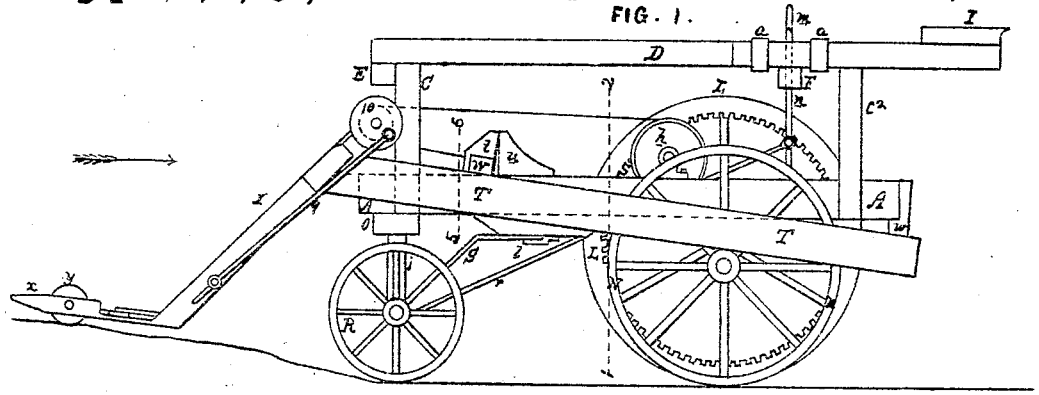
Figures 2, 3:
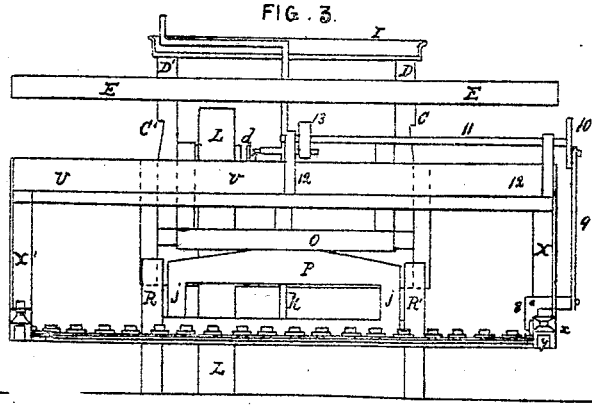
Figure 4:
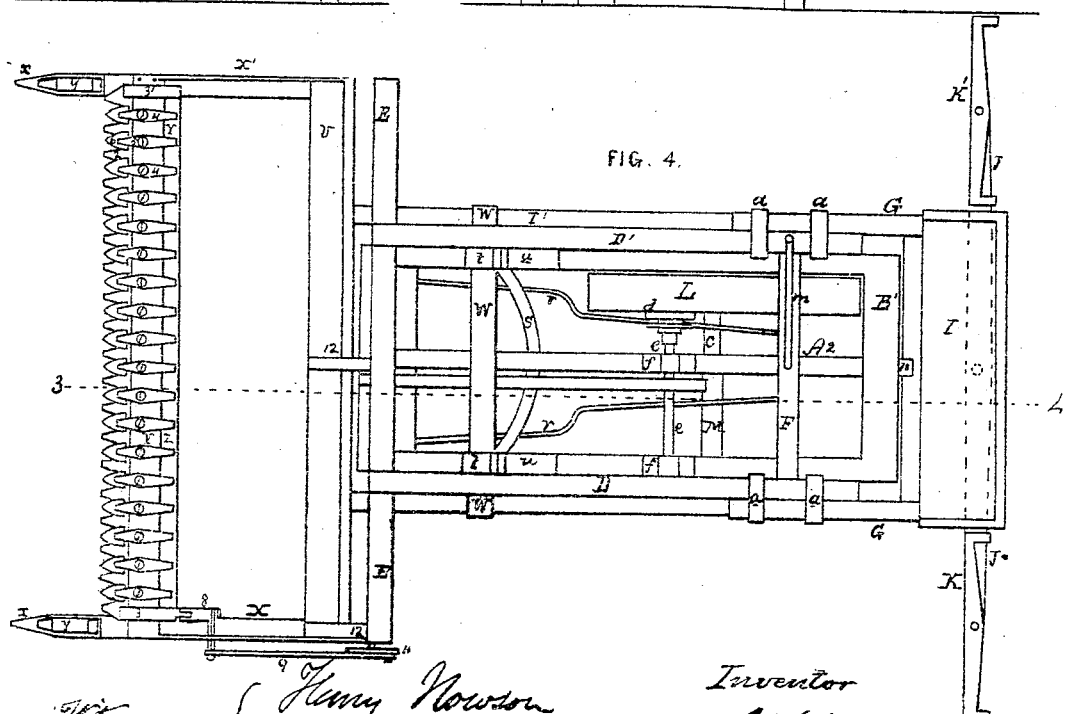

On reference to the drawings which form a part of this specification, Figure 1 is a side elevation of my improved machine as arranged for mowing. Fig. 2 is a transverse section on the line 1 2, Fig. 1, looking in the direction of the arrow. Fig. 3 is an end elevation of Fig. 1, also looking in the direction of the arrow. Fig. 4 is a ground plan of Fig. 2. Fig. 5 is a longitudinal sectional elevation on the line 3 4, Fig. 4, showing the supplementary frame as attached when the machine is used for reaping. Fig. 6 is a face view of the supplementary frame as it appears when looking in the direction of the arrow, Fig. 5. Figs. 7 and 8, sectional views on the line 5 6, Fig. 1, and illustrating the adjustability of the cutter-frame; Fig. 9, an enlarged plan of part of the cutting apparatus; Fig. 10, a transverse section on the line 6 7, Fig. 9; Fig. 11, a section still further enlarged, showing the manner of connecting the cutter-levers to the fulcrum-bar.

The same letters of reference allude to similar parts throughout the several views.

A, A', and A² are three longitudinal beams, tied together at the front end by the cross-piece B and at the rear end by the cross-piece B'. C, C', C², and C³ are four upright pieces, secured at the bottom to the longitudinal beams A and A', and at the top to the bars D and D', and connected together in front by the transverse bar E and at the back by the cross-piece F. The above parts form what I term the "permanent" or "gear" frame of the machine.

At the end of the bars D and D' is secured, by means of staples *a a*, so as to be adjustable, a frame composed of the side pieces, G and G', and the strong cross-piece H. On this frame is secured the seat I for the driver. Underneath the cross-bar H, and swiveling on a pin attached to the same, is the lever J, to the opposite ends of which are jointed the whiffletrees K and K' for receiving the traces of the horses.

To the under side of the longitudinal pieces A' and A² are secured the boxes *b b* for the shaft *c*, and to the latter is attached the driving-wheel L, having internal teeth, which gear into the teeth of the pinion *d* on the shaft *e*. This shaft revolves in boxes *f f*, secured to the top of the longitudinal beams A and A². The shaft *e* is furnished with a clutch, *g*, which has projections fitting into similar projections on the pinion *d*, so that by withdrawing the clutch from the pinion the movement of the shaft *e* is instantly stopped. The shaft *e* is also furnished with a pulley, *h*, hereinafter referred to.

M is an axle-tree, secured to hangers *i i* which are attached to the under side of the longitudinal beams A and A² of the gear-frame. On the end of this axle-tree is hung the supporting-wheel N.

O is a beam secured under and across the front end of the beams A, A', and A², and resting on the bar P, attached by means of upright pieces *j* to the front axle-tree, Q, on the ends of which are hung the wheels R and R'. A pin, *k*, passing through the axle-tree Q and bar P into the beam O, allows the frame with the wheels R and R' to swivel, similar to those of an ordinary wagon. A bent bar, S, having its two ends attached to the axle-tree Q and passing through a staple, l, on a piece projecting from the under side of the beam $A^2$, serves to steady and guide the frame as it is being turned by means of the cranked handle m, which forms a part of or is otherwise attached to the vertical spindle n. The latter passes through and is guided by the cross-piece F, its end bearing in a hole in the longitudinal beam $A^2$.

The spindle n is furnished with a cross-piece, q, the ends of which are connected by means of rods r r to eyes fastened near each end of the axle-tree Q, thus allowing the operator on the seat I, by simply turning the handle m, to guide the machine as it is drawn over the ground.

T and T' are longitudinal beams, connected together in front by the beam U and at the back by the cross-piece V. They are further connected together by a third cross-piece, W, which has two lugs, t, coinciding with and bearing against two similar lugs, u, secured to the top of the longitudinal beams A and A'. The cross-piece W has likewise two beveled pieces, v, (see Figs. 7 and 8,) bearing against the inside of the longitudinal pieces A and A'. A curved piece, w, suspended from and secured to the cross-piece B' of the gear-frame, fits into a slot in the back cross-bar, V. Thus the movable frame, composed of the longitudinal pieces T and T' and cross-pieces U, V, and W, with attachments, more fully described hereinafter, is maintained laterally and longitudinally in its proper position as regards the gear-frame by the lugs t and u, beveled piece v, and suspended piece w. Still it may be readily raised and lowered with the lugs t and u as the point of vibration, and likewise may be raised to an angular position laterally with the gear-frame, as seen in Figs. 7 and 8, and more fully alluded to hereinafter.

To the opposite ends of the cross-bar U of the movable frame are secured the diagonal bars X and X', which are bent toward the bottom and terminate in the master guard-teeth x and x', each of which is furnished with a small roller, y, resting on the ground. Near the point where the arms X and X' are bent they are connected together by the fulcrum-bar Y. (See Fig. 9.) At the back of this fulcrum-bar, and fitting snugly against it, is another bar, Z, and in front is the cutter-bar 2, which is connected to the bar Z by the cross-pieces 3 and 3' in such a manner that both bars may move together, the fulcrum-bar being the guide.

A series of cutter-levers, 4, have their fulcrums on pins 5, screwed into the fulcrum-bar V on one end. These levers have points projecting downward into oblong slots in the bar Z, as seen in Fig. 9. The other ends are furnished with cutters 6, having their sides and points beveled to a sharp cutting-edge, the under side of the cutters being flat. The cutting-projections from the cutter-bar 2 are beveled on the under side, the top being flat, so that the flat surface of upper and lower cutters are contiguous to each other.

It will be observed, on reference to Fig. 11, that the pins 5, which form the fulcrums of the levers 4, are peculiarly arranged as regards the latter. The beveled heads of the pins do not fit accurately into the countersink of the levers, but on the top edge only, the sides of the countersink having a greater inclination than those of the beveled heads. The diameter of the pins, too, are somewhat less than the eyes of the levers 4, through which they pass. The object of this arrangement will be apparent hereinafter. From the cross-piece 3 projects a pin, 7, fitting between the prongs of the forked arm of the bell-crank lever 8, the other arm of this lever being connected by means of the rod 9 to the pin on the crank-wheel 10, which is attached to the shaft 11, the latter having its bearings in the brackets 12, secured to the cross-bar U of the movable frame of the machine. To the shaft 11 is secured a pulley, 13, round which passes a strap, 14, from the pulley h.

The machine as above described is arranged and adapted for mowing only. The apparatus to be attached when used for reaping will be referred to hereinafter. The horses are situated outside and one on each side of the body of the machine, the traces being secured to the whiffletrees K and K', and the breast-chains of the horses to the ends of the cross-bar E. The distance between the whiffletrees and cross-bar E may be regulated, so as to be adapted to horses of different sizes, by sliding in or out the pieces G. As the machine is drawn over the ground the rollers y in the master guard-teeth x pass over any inequalities on the surface, causing the movable or cutter frame to oscillate and adjust itself to such inequalities or undulations, as seen in Figs. 1 and 5, the junction of the lugs t and u being the center of oscillation. This movement of the cutter-frame in no way affects the proper working of the machine or the effective operation of the cutters, for as the rollers y rise over elevated ground and raise the cutter-frame, the points of the lugs t on the bar W will bear against the tops u of the gear-frame, and have a tendency to project the whole of the cutter-frame slightly forward. Thus the band or chain 14 will be maintained tight round the surfaces of both pulleys h and 13 at whatever position the cutter-frame may be in respect to the gear-frame; and it is not only to the longitudinal vibration of the cutter-frame that the latter remarks apply, but to the lateral oscillation also, for the projecting pieces v are so constructed as to allow the said cutter-frame to be moved laterally at an angle, either on one side or the other, as seen in Figs. 7 and 8, according to the undulations on the ground over which the rollers y pass. It will be easily seen that the same remarks also apply to instances in which the front wheels, R and R′, may drop either together or separately into ruts, or rise over any projections on the surface of the ground.

As the machine is drawn over the ground motion is communicated from the driving-wheel L through the pinion d to the shaft e and pulley h, thence through the chain or band 14 to the pulley 13 and shaft 11, and through the crank-wheel 10 and connecting-rod 9, communicating motion to the bell-crank lever 8, which imparts a reciprocating motion to the bar Z and cutter-bar 2, and consequently a vibrating motion to the cutter-levers 4, which work on the pins 5, screwed into the permanent fulcrum-bar X. The peculiar arrangement of these screws in respect to the levers 4 has been already described in reference to Fig. 11, and this arrangement is such that immediately the edges of the cutters 6 on the levers 4 bear the stalks of grain or grass against the cutting-edges on the bar 2 the said levers have a tendency to tilt over, so as to bring the cutting-edges of their cutters in close and immediate contact with the cutting-edges on the bar 2, and the stalks submitted to their action are divided much more effectually than by knives passing through fingers in the usual way. As the machine is in operation this tilting of the levers 4 takes place immediately the reversing motion occurs.

By my arrangement of causing the cutter-levers 4 to move simultaneously with the slotted bar Z and cutter-bar 2 it is evident that but one-half the movement required in ordinary machines is sufficient in this instance. Consequently the movements of the machine are quicker and more efficient.

When the machine has to be used for reaping I employ the frame shown in Figs. 5 and 6, composed of two longitudinal pieces, 15 and 15′, connected together by the cross-pieces 16 and 16′, and furnished at each end with rollers 17 and 17′, having three recesses for receiving the endless bands 18 18 18, which pass from one roller to the other. The upper end of the spindle of the roller 17 projects above the top of the longitudinal beam 15, and is furnished with a bevel-wheel, 19, gearing into a similar bevel-wheel, 20, on the shaft 21, which has its bearings in the brackets 22 and 23, secured to the longitudinal beam 15.

On the shaft 21 is a pulley, 23, round which passes a chain or band, 24, down to and round the pulley 26 on the shaft 25. The latter has its bearings on brackets 27, secured to the lower longitudinal beam, each end of the shaft being furnished with a wheel, 28.

The frame above described is attached by means of screw-bolts to the cross-beam U of the cutter-frame, and rests toward the bottom against the diagonal arms X and X′, as seen distinctly in Fig. 5, the wheels 28 resting on the ground, so that as the machine is drawn over the ground the wheels, with their shaft, will turn, and through the strap 24 give motion to the shaft 21, and consequently through the wheel 19 and 20 to the rollers 17, causing the bands to traverse and carry the grain-stalks as they are cut by the cutters above-described to one side of the machine.

It will be seen that I obtain the motion for accomplishing this end without connections to the moving parts of the gear-frame.

Having now described the nature of my invention and the manner in which the same is carried into effect, I wish it to be understood that I do not claim exclusively double cutters operating simultaneously, nor the use of vibrating cutters, nor belts for carrying off the grain to one side of the machine; but

What I claim, and desire to secure by Letters Patent, is—

The gear-frame, with its lugs u u, in combination with the movable or cutter frame, its bar W, lugs t t, and beveled projections v v, the whole being arranged and constructed substantially in the manner and for the purposes set forth.

B. T. RONEY.

Witnesses:
HENRY HOWSON,
WILLIAM E. WALTON.